(12) United States Patent
Shankar

(10) Patent No.: US 9,443,086 B2
(45) Date of Patent: Sep. 13, 2016

(54) SYSTEMS AND METHODS FOR FIXING APPLICATION VULNERABILITIES THROUGH A CORRELATED REMEDIATION APPROACH

(75) Inventor: Mohanakrishnan Shankar, Chennai (IN)

(73) Assignee: Infosys Limited, Bangalore (IN)

( * ) Notice: Subject to any disclaimer, the term of this patent is extended or adjusted under 35 U.S.C. 154(b) by 1029 days.

(21) Appl. No.: 13/533,407

(22) Filed: Jun. 26, 2012

(65) Prior Publication Data

US 2013/0227695 A1 Aug. 29, 2013

(30) Foreign Application Priority Data

Feb. 23, 2012 (IN) .............................. 669/CHE/2012

(51) Int. Cl.
*G06F 21/57* (2013.01)

(52) U.S. Cl.
CPC ....... *G06F 21/577* (2013.01); *G06F 2221/033* (2013.01)

(58) Field of Classification Search
CPC ........... G06F 21/577; G06F 2221/033; H04L 63/1433
See application file for complete search history.

(56) References Cited

U.S. PATENT DOCUMENTS

| | | | |
|---|---|---|---|
| 6,839,850 B1 | 1/2005 | Campbell et al. | |
| 7,284,274 B1 * | 10/2007 | Walls et al. | 726/25 |
| 8,499,353 B2 * | 7/2013 | Lockhart et al. | 726/25 |
| 8,528,093 B1 * | 9/2013 | Kureha et al. | 726/25 |
| 8,776,239 B2 * | 7/2014 | De Keukelaere et al. | 726/25 |
| 2006/0191007 A1 | 8/2006 | Thielamay | |
| 2011/0173699 A1 | 7/2011 | Figlin et al. | |

FOREIGN PATENT DOCUMENTS

JP 2010205287 A 9/2010

* cited by examiner

*Primary Examiner* — Zachary A Davis

(74) *Attorney, Agent, or Firm* — LeClairRyan, a Professional Corporation

(57) ABSTRACT

The invention relates to a system and method for fixing application vulnerabilities through a correlated remediation approach. This invention involves identifying application vulnerabilities through dynamic and static assessment of an application. The vulnerability instances reported in the static assessment are fixed using standard code fixes. The assessment results obtained from the static and the dynamic assessment are then correlated to identify how many vulnerability instances reported in the static assessment are fixed by the standard code fixes. If a vulnerability instance reported in the dynamic assessment corresponds to more than one vulnerability instance reported in the static assessment then the shortest and most cost effective path to fix the vulnerability instance is determined. These results are stored in a graph database and based on the graph database the application vulnerabilities are fixed. An inference engine can be used to identify the correct fix for an application vulnerability.

15 Claims, 5 Drawing Sheets

SYSTEMS AND METHODS FOR FIXING APPLICATION VULNERABILITIES THROUGH A CORRELATED REMEDIATION APPROACH

This application claims the benefit of Indian Patent Application Filing No. 669/CHE/2012, filed Feb. 23, 2012, which is hereby incorporated by reference in its entirety.

FIELD

The present invention relates to fixing one or more application vulnerabilities, and in particular, to systems and methods for fixing one or more application vulnerabilities through a correlated remediation approach.

BACKGROUND

Secure applications and systems are one of the important concerns for organizations. Organizations are starting to realize the pronounced exposure to threats both from inside and outside the enterprises. While organizations embark on Security programs, the primary objective is to quantify, reduce and mitigate the risk exposure of applications. The current technology fixes application vulnerabilities through dynamic security assessment, static security assessment, manual security assessment of one or more applications and information technology security controls and process.

Web application security assessments operate as dynamic security assessments which try to simulate how an attacker would attack a web application without knowledge of the code. The attacker tries to provide various inputs and tries to understand how the application works and exploits the vulnerabilities present in the application. On the other hand, during a static code security assessment, the code is assessed for any known patterns of code constructs which could potentially lead to a vulnerability. Most often the results found out from static code analyzer may not be able to understand how the application could be exploited by an attacker and also generate quite a lot of false positives.

Though it is important for both these type of assessments to be performed so that security vulnerability can be identified upfront early in Software Development Life Cycle (SDLC) and fixed, most often there is no common mapping to cure these vulnerability instances in these two different types of security assessments. This often leads to vulnerability remediation programs which purely work on individual assessment recommendations and knowledge of the developer and it is quite time and cost intensive to remediate the vulnerabilities.

Thus there is no mechanism that currently exists to seamlessly correlate these assessment results for working on a remediation mechanism. Most of the critical vulnerabilities are not accurately fixed by the present approach. The existing product vendors and technologies are aligned to specific vulnerability identification techniques such as static security assessment or dynamic security assessment and there is no clear cut mechanism to apply these findings in remediation of these vulnerabilities. There are quite heavy false positives in both types of assessment techniques resulting in a huge impact on human effort for correlation.

In view of the foregoing discussion, there is a need for a unified approach to correlate the static and the dynamic security findings for better and quick quicker remediation of the application vulnerabilities.

SUMMARY

The present invention overcomes the before mentioned problem by providing a unified approach to correlate a static and a dynamic security assessment of an application. This integrates knowledge based risk assessments with static and dynamic security assessment. Thus, the present approach reduces the manual effort and cost of remediation.

According to the present embodiment, a method for fixing one or more application vulnerabilities is disclosed. The method includes identifying the one or more application vulnerabilities through a first dynamic security assessment and a static security assessment of an application. Thereafter, at least one vulnerability instance reported in the static security assessment is fixed based on a standard secure coding practice. Then, a plurality of dynamic security assessments are run to identify one or more the vulnerability instances reported in the first dynamic security assessment that have been fixed by the fixing of the at least one vulnerability instance reported in the static security assessment. After that, one or more vulnerability instances reported in the plurality of dynamic security assessments corresponding to the at least one vulnerability instance reported in the static security assessment are identified by correlating one or more results of the plurality of dynamic security assessments and the static security assessment. The method further includes determining a shortest path to fix the one or more application vulnerabilities in the event of the one or more vulnerability instances reported in the plurality of dynamic security assessments corresponding to two or more vulnerability instances reported in the static security assessment. Subsequently, the shortest path to fix the one or more application vulnerabilities is identified based on the correlation of the plurality of dynamic security assessments and the static security assessment. In accordance with an embodiment of the present invention, information related to the correlation of the plurality of dynamic security assessments and the static security assessment and the shortest path to fix the one or more application vulnerabilities are stored in a graph database. The method further includes processing one or more rules, one or more conditions and the information stored in the graph database to find one or more remediation measures for the one or more application vulnerabilities.

In an additional embodiment, a system for fixing one or more application vulnerabilities is disclosed. As disclosed the system includes a processor readable storage medium in communication with a processor, wherein the processor readable storage medium contains one or more programming instructions for identifying one or more application vulnerabilities through a first dynamic security assessment and a static security assessment of an application, fixing at least one vulnerability instance reported in the static security assessment based on a standard secure coding practice, running a plurality of dynamic security assessments to identify one or more vulnerability instances reported in the first dynamic security assessment that have been fixed by the fixing of the at least one vulnerability instance reported in the static security assessment, identifying one or more vulnerability instances reported in the plurality of dynamic security assessments corresponding to the at least one vulnerability instance reported in the static security assessment by correlating one or more results of the plurality of dynamic security assessments and the static security assessment, determining a shortest path to fix the one or more application vulnerabilities in the event of the one or more vulnerability instances reported in the plurality of dynamic security assessments corresponding to two or more vulnerability instances reported in the static security assessment and fixing the one or more vulnerabilities based on the correlation of the plurality of dynamic security assessments and the static security assessment for the one or more application vulnerabilities and the shortest path to fix the one or more application vulnerabilities. In accordance with an embodiment of the present invention, the processor readable storage medium further contains one or more programming instructions for storing information related to the correlation of the plurality of dynamic security assessments and the static security assessment and the shortest path to fix the one or more application vulnerabilities in a graph database and processing one or more rules, one or more conditions and the information stored in the graph database to find one or more remediation measures for the one or more application vulnerabilities.

In another embodiment, a computer program product for fixing one or more application vulnerabilities is disclosed. The computer program product includes a computer usable medium having a computer readable program code embodied therein for fixing one or more application vulnerabilities. The computer readable program code stores a set of instructions configured for identifying one or more application vulnerabilities through a first dynamic security assessment and a static security assessment of an application, fixing at least one vulnerability instance reported in the static security assessment based on a standard secure coding practice, running a plurality of dynamic security assessments to identify a one or more vulnerability instances reported in the first dynamic security assessment that have been fixed by the fixing of the at least one vulnerability instance reported in the static security assessment, identifying one or more vulnerability instances reported in the plurality of dynamic security assessments corresponding to the at least one vulnerability instance reported in the static security assessment by correlating one or more results of the plurality of dynamic security assessments and the static security assessment, determining a shortest path to fix the one or more application vulnerabilities in the event of the one or more vulnerability instances reported in the plurality of dynamic security assessments corresponding to two or more vulnerability instances reported in the static security assessment and fixing the one or more vulnerabilities based on the correlation of the plurality of dynamic security assessments and the static security assessment for the one or more application vulnerabilities and the shortest path to fix the one or more application vulnerabilities. In accordance with an embodiment of the present invention, the computer readable program code further stores a set of instructions configured for storing information related to the correlation of the plurality of dynamic security assessments and the static security assessment and the shortest path to fix the one or more application vulnerabilities in a graph database and processing one or more rules, one or more conditions and the information stored in the graph database to find one or more remediation measures for the one or more application vulnerabilities.

DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present disclosure provide a system and method for fixing one or more application vulnerabilities, where the results obtained from a dynamic security assessment and static security assessment of an application are correlated and the best approach to fix the vulnerabilities is identified. The application vulnerability fixing can be done by using an inference engine.

Figure 1:
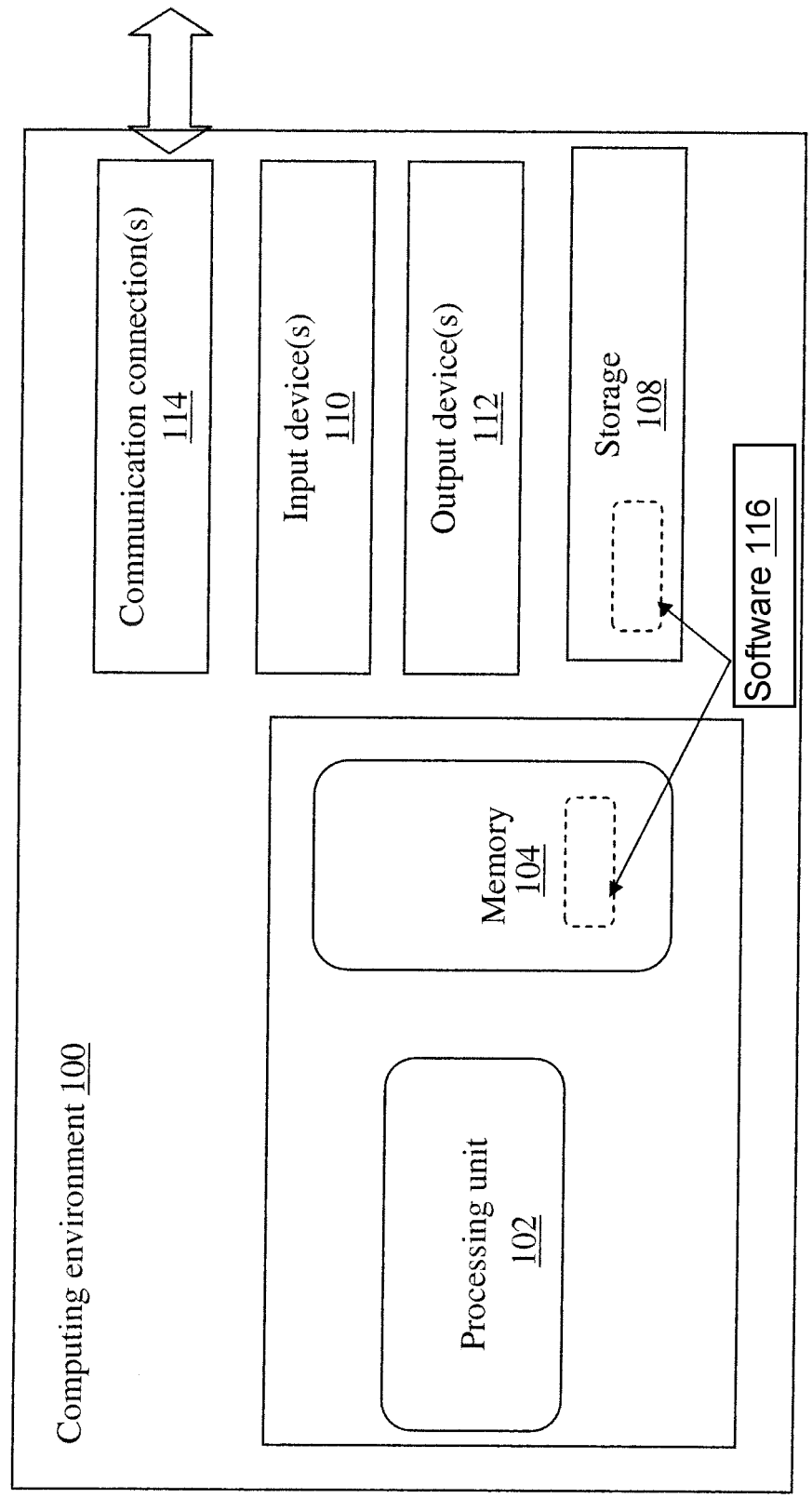
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processor system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can, for example, implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
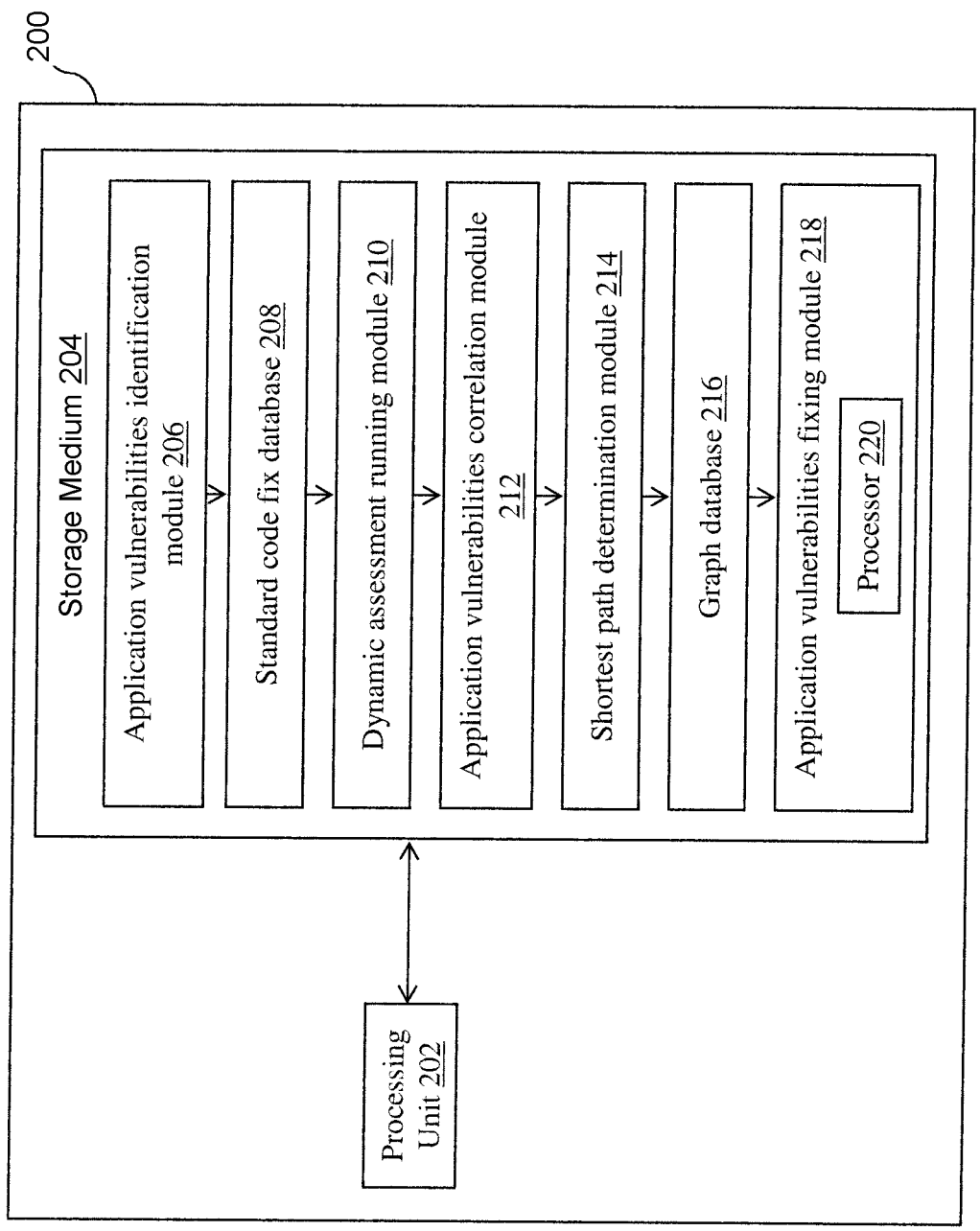
FIG. 2 is a block diagram illustrating a system for fixing one or more application vulnerabilities, in accordance with an embodiment of the present invention.

FIG. 2 is a block diagram illustrating a system 200 for fixing one or more application vulnerabilities, in accordance with an embodiment of the present disclosure. More particularly, FIG. 2 depicts a subset of the computing environment in FIG. 1. The computing environment 200 comprises a processing unit 202 in operable connection with a processor readable storage medium 204. The processor readable storage medium 204 comprises an application vulnerabilities identification module 206, a standard code fix database 208, a dynamic assessment running module 210, an application vulnerabilities correlation module 212, a shortest path determination module 214, a graph database 216 and an application vulnerabilities fixing module 218.

In various embodiments of the present disclosure, the application vulnerabilities identification module 206 is configured to identify one or more application vulnerabilities. The one or more application vulnerabilities are identified by a dynamic and a static security assessment of an application. The identified one or more application vulnerabilities are then fed to a database which has following key elements:
 a. Application Name
 b. Vulnerability Name—Map to Industry standard (such as Common Vulnerabilities and Exposure (CVE) Nomenclature)
 c. Vulnerability Entry and Exit points (from Dynamic Analysis)
 d. Vulnerability Exploit—Input Payload (from Dynamic Analysis)
 e. Application Module or Function name (from Static Analysis)
 f. Instance of occurrence of Vulnerability (from Static analysis)
 g. Specific vulnerability process point (from Static analysis)
 h. HTTP Request/Response Information (from Dynamic Analysis)

The vulnerability database also populates data that exists in any in-house organization vulnerability database. One or more scripts are run to identify the various occurrences of vulnerability across the application and populate the database and a sort is run to organize the data based on a given vulnerability. An example of this may include but is not limited to categorization based on Cross Site Scripting (XSS) attacks and its instance of occurrence. A data snapshot is created for one or more application vulnerabilities, for example XSS attack and its instances.

In an aspect of the system described, the standard code fix database 208 is configured to fix at least one vulnerability instance reported in a static security assessment. This database is created based on the industry standard best practices for coding for platform specific code fixes. Using the data snapshot created the at least one vulnerability instance reported in the static security assessment is fixed based on the standard code fix stored in the standard code fix database 208.

In an additional aspect, the dynamic assessment running module 210 is configured to run a plurality of dynamic security assessments to identify how many vulnerability instances reported in the first dynamic security assessment have been fixed after fixing the vulnerability instances reported in the static security assessment based on the standard code fix.

In another aspect of the system described, the application vulnerabilities correlation module 212 is configured to correlate the at least one vulnerability instance reported in the static security assessment and the one or more vulnerability instances reported in the plurality of dynamic assessments. The correlation is performed through a matching algorithm. The one or more vulnerability instances reported in the plurality of dynamic security assessments are fixed based on the at least one fixed vulnerability instance reported in the static security assessment. The results of the correlation of vulnerability instances are represented in a bipartite graph where the nodes of the graph show the vulnerabilities and their association with two different scans.

The correlation approach helps to identify how many vulnerability instances reported in the plurality of dynamic security assessments have been fixed by fixing the at least one vulnerability instance reported in the static security assessment with the help of the standard code fix database 208. Thus, a vulnerability instance reported in the plurality of dynamic security assessments can match with one or more vulnerability instances reported in the static security assessment. The result of the matching pattern can be populated in a database. A score or weight is assigned for each matching pattern and criteria for scoring may include the time taken to fix the match, whether the match perfectly fixes the vulnerability and the maximum matching edges in the bipartite graph. The criteria for scoring can be something defined based on the following—
 a. Time taken to fit the match
 b. Whether the match perfectly fixes the vulnerability
 c. Maximum matching edges in a graph In a further aspect of the system described, the shortest path determination module 214 is configured to determine the shortest path to fix the one or more application vulnerabilities if the one or more vulnerability instances reported in the plurality of dynamic security assessments match with two or more vulnerability instances reported in the static security assessment. The shortest path is determined by using a shortest path algorithm. An example of a shortest path algorithm may include but is not limited to the Djikstra algorithm. For a given source vertex (node) in the bipartite graph, the algorithm finds the path with lowest cost, i.e. the shortest path. The graph database 216 is configured to store the correlation result and the information related to the shortest path.

In an additional aspect of the system described, the application vulnerabilities fixing module 218 is configured to fix the one or more application vulnerabilities based on the results of the correlation and the shortest path. In an alternative embodiment, the application vulnerabilities fixing module 218 may include a processor 220 configured to process one or more rules, conditions and graph database to find one or more remediation for the application vulnerabilities.

Figure 3:
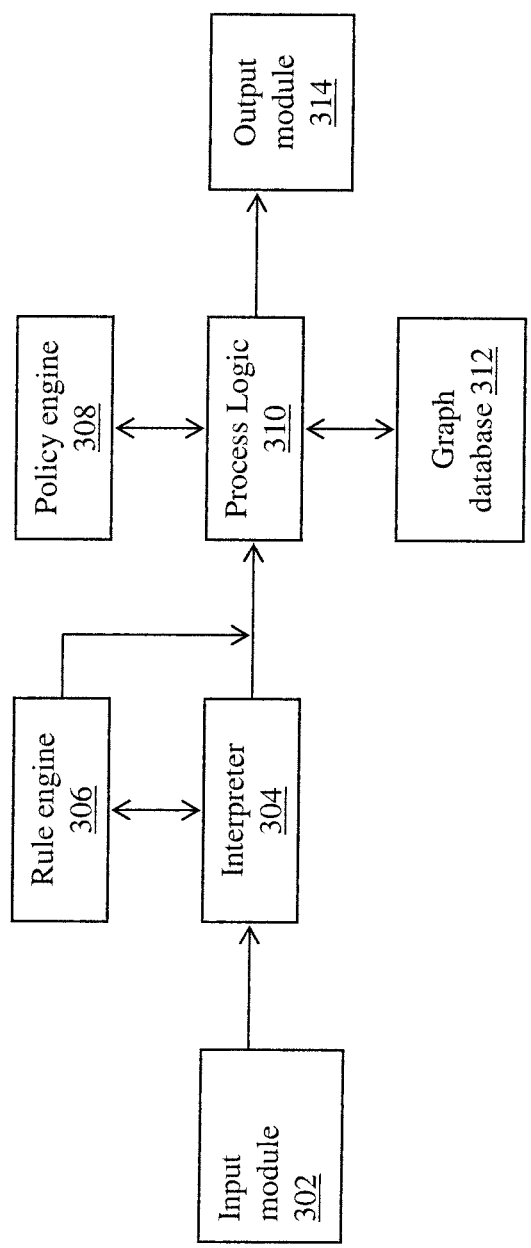
FIG. 3 is a block diagram illustrating an inference engine to fix one or more application vulnerabilities, in accordance with an embodiment of the present invention.

FIG. 3 is a block diagram illustrating an inference engine to fix one or more application vulnerabilities, in accordance with an embodiment of the present disclosure. The inference engine includes an input module 302 configured to receive an user request for fixing the one or more application vulnerabilities; an interpreter 304 configured to interpret the input; a rule engine 306 configured to apply corresponding rules to the inputs; a policy engine 308 configured to check alignment with one or more policies; a process logic 310 configured to process the one or more rules in alignment with one or more policies; the graph database 312; and an output module 314. The output includes displaying the nearest match for fixing application vulnerabilities from the graph database or integrating the information to the application system to facilitate fixing the application vulnerabilities. The inference engine can fix the one or more application vulnerabilities in an automated way once there is feedback on fix information back to graph database, so the inference engine learns by itself as an intelligent system for automation in future and behaves as a true expert system. The inference engine includes one or more vulnerability types and attributes, application classes, conditions, rules and actions. In a descriptive example that is not intended to limit the invention, the vulnerability type may include different types of vulnerabilities; for example, if a vulnerability type is cross site scripting then it can have multiple attributes like cross site scripting, cross site request forgery and so forth. The application class is determined based on the one or more rules to be executed. The application class may include a platform, business applications, enterprise applications and so forth. The one or more rules are executed based on the one or more predefined conditions. Based on the one or more conditions and rules the action is triggered which helps in finding the nearest match from the graph database 312 which stores one or more results of the correlation of dynamic and static assessment and the shortest path to fix the one or more application vulnerabilities.

Figure 4:
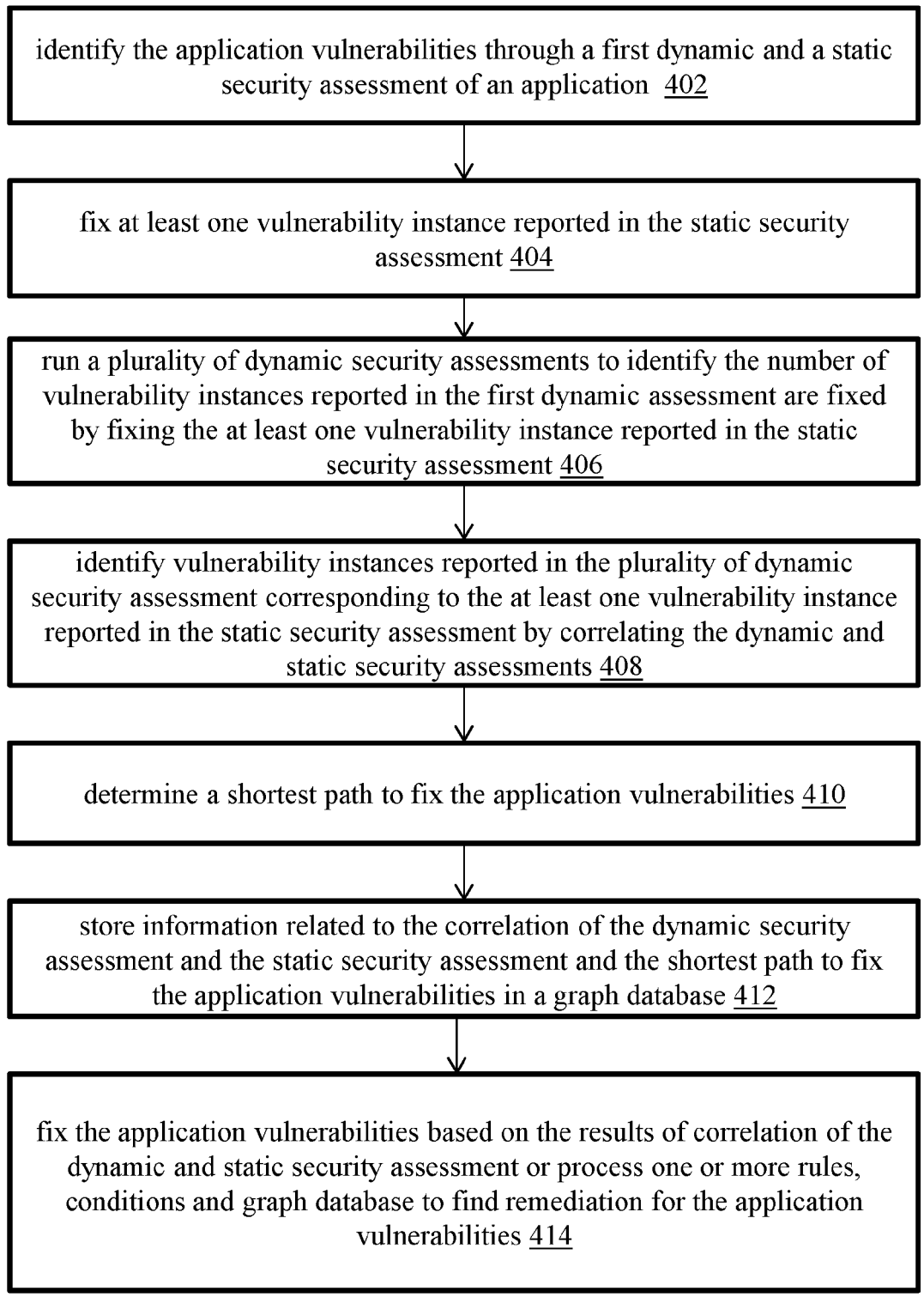
FIG. 4 is a flowchart, illustrating a method for fixing one or more application vulnerabilities, in accordance with an embodiment of the present invention.

FIG. 4 is a flowchart, illustrating a method for fixing one or more application vulnerabilities, in accordance with an embodiment of the present disclosure. The method includes identifying the application vulnerabilities through a dynamic and a static security assessment of an application, as in block 402. Further, as in block 404, at least one vulnerability instance reported in the static security assessment is fixed based on the industry standard best practices. Fixing the at least one vulnerability instance reported in the static security assessment may also fix one or more vulnerability instances reported in the dynamic security assessment, i.e. the one or more vulnerability instances reported in the dynamic assessment are matched with the at least one vulnerability instance reported in the static assessment. Further, as in block 406, a plurality of dynamic security assessments are performed to identify the number of vulnerability instances reported in the first dynamic assessment that have been fixed by the fixing of the at least one vulnerability instance reported in the static security assessment. Further, as in block 408, the one or more vulnerability instances reported in the plurality of dynamic security assessments corresponding to the at least one vulnerability instance reported in the static assessment are identified through a matching algorithm. One or more results of correlation are represented in a bipartite graph. The result of the matching pattern can be populated in a database. A score or weight is assigned for each matching pattern and criteria for scoring may include the time taken to fix the match, whether the match perfectly fixes the vulnerability and the maximum matching edges in the bipartite graph. If the one or more vulnerability instances reported in the plurality of dynamic security assessments match with two or more vulnerability instances reported in the static assessment then the shortest path to fix the one or more vulnerabilities reported in the plurality of dynamic security assessment is determined, as in block 410. This is performed by using a shortest path algorithm. An example of such algorithm may include but is not limited to the Djikstra algorithm. Further, as in block 412, the information related to the result of the correlation of the dynamic and static security assessment and the shortest path is stored in a graph database. Application vulnerabilities can be fixed by using the information stored in the graph database or one or more rules, conditions and the graph database can be processed to fix the one or more application vulnerabilities, as in block 414. The processing is done by an inference engine.

Figure 5:
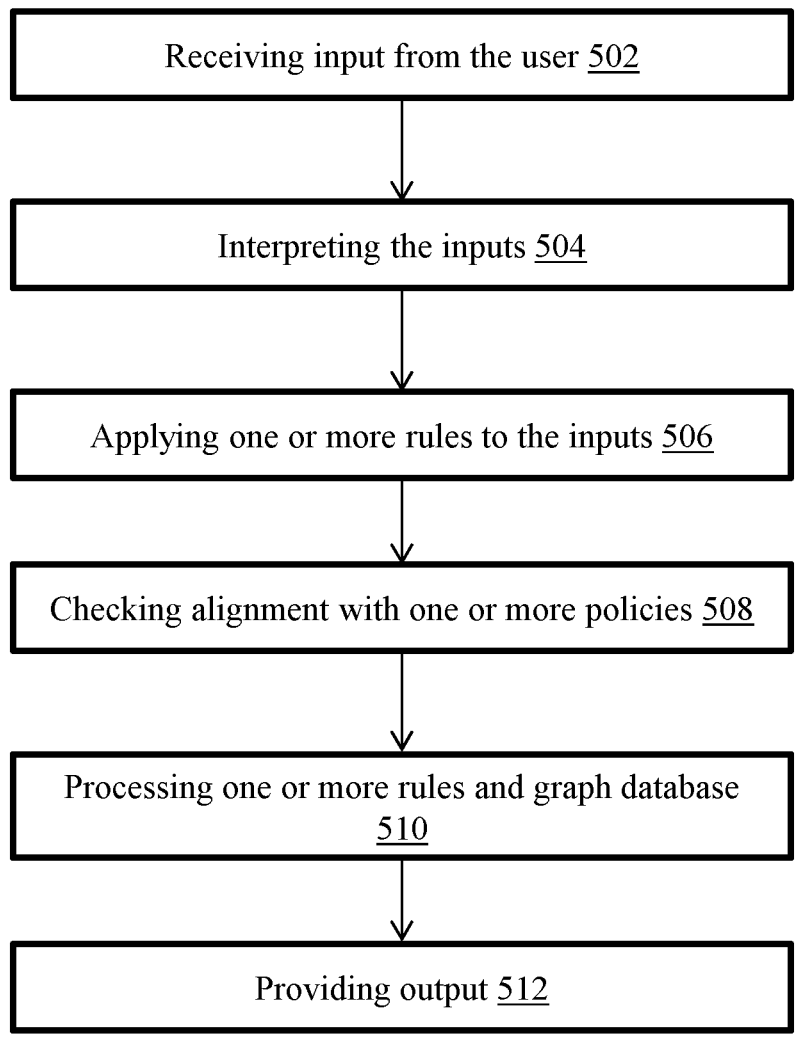
FIG. 5 is a flowchart, illustrating a method for processing one or more rules to identify at least one fix for one or more application vulnerabilities, in accordance with an embodiment of the present invention.

FIG. 5 is a flowchart, illustrating a method for processing one or more rules to identify at least one fix for one or more application vulnerabilities, in accordance with an embodiment of the present disclosure. In one embodiment of the present disclosure, the user or a process or a service provides inputs to find one or more fixes for the one or more application vulnerabilities, as in block 502. Further, as in block 504, the inputs are interpreted by the interpreter. Thereafter, as in block 506, one or more rules are applied to the inputs. Further, as in block 508, the alignment of the one or more rules with the one or more policies is checked. Then, the one or more rules in alignment with the one or more policies and the graph database are processed. The one or more rules are executed based on one or more pre-defined conditions, as in block 510. Based on the one or more conditions and rules the inference engine provides the output, as in block 512. The output includes displaying the nearest match for fixing application vulnerabilities from the graph database or integrating the information to the application system to facilitate fixing the application vulnerabilities. The inference engine can fix the one or more application vulnerabilities in an automated way once there is feedback on fix information back to graph database, so the inference engine learns by itself as an intelligent system for automation in future and behaves as a true expert system.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

I claim:

1. A method for fixing application vulnerabilities, comprising:
   identifying, by a computing device, one or more application vulnerabilities through a first dynamic security assessment and a static security assessment of an application;
   fixing, by the computing device, at least one of a first set of vulnerability instances reported in the static security assessment based on a secure coding practice;
   running, by the computing device, a plurality of other dynamic security assessments to identify one or more of a second set of vulnerability instances reported in the first dynamic security assessment that have been fixed by the fixing of the at least one of the first set of vulnerability instances reported in the static security assessment;

identifying, by the computing device, one or more of a third set of vulnerability instances reported in the plurality of other dynamic security assessments that correspond to the at least one of the first set of vulnerability instances reported in the static security assessment by correlating one or more results of the plurality of other dynamic security assessments and the static security assessment;

determining, by the computing device, a shortest path to fix the one or more application vulnerabilities when one or more of the third set of vulnerability instances reported in the plurality of other dynamic security assessments correspond to at least one of the first set of vulnerability instances reported in the static security assessment; and fixing, by the computing device, the one or more application vulnerabilities based on the correlation and the shortest path to fix the one or more application vulnerabilities.

2. The method as claimed in claim 1, further comprising creating, by the computing device, a database configured to store information related to at least the third set of vulnerability instances reported in the plurality of other dynamic security assessments and the first set of vulnerability instances reported in the static security assessment.

3. The method as claimed in claim 1, further comprising running, by the computing device, one or more scripts to organize information related to the one or more application vulnerabilities.

4. The method as claimed in claim 1, wherein one or more results of the correlation are represented in the form of a bipartite graph.

5. The method as claimed in claim 1, wherein information related to the correlation of the plurality of other dynamic security assessments and the static security assessment and the shortest path to fix the one or more application vulnerabilities is stored in a graph database to facilitate remediation.

6. A computing device comprising a processor and a memory coupled to the processor, wherein the processor is configured to execute programmed instructions stored in the memory to:

identify one or more application vulnerabilities through a first dynamic security assessment and a static security assessment of an application;

fix at least one of a first set of vulnerability instances reported in the static security assessment based on a secure coding practice;

run a plurality of other dynamic security assessments to identify one or more of a second set of vulnerability instances reported in the first dynamic security assessment that have been fixed by the fixing of the at least one of the first set of one vulnerability instances reported in the static security assessment;

identify one or more of a third set of vulnerability instances reported in the plurality of other dynamic security assessments that correspond to the at least one of the first set of vulnerability instances reported in the static security assessment by correlating one or more results of the plurality of other dynamic security assessments and the static security assessment;

determine a shortest path to fix the one or more application vulnerabilities when one or more of the third set of vulnerability instances reported in the plurality of other dynamic security assessments correspond to at least one of the first set of vulnerability instances reported in the static security assessment; and fix the one or more application vulnerabilities based on the correlation and the shortest path to fix the one or more application vulnerabilities.

7. The computing device as claimed in claim 6, wherein the processor coupled to the memory is further configured to execute at least one additional programmed instruction stored in the memory to: create a database configured to store information related to at least the third set of vulnerability instances reported in the plurality of other dynamic security assessments and the first set of vulnerability instances reported in the static security assessment.

8. The computing device as claimed in claim 6, wherein the processor coupled to the memory is further configured to execute at least one additional programmed instruction stored in the memory to: run one or more scripts configured to organize information related to the one or more application vulnerabilities.

9. The computing device as claimed in claim 6, wherein one or more results of the correlation are represented in the form of a bipartite graph.

10. The computing device as claimed in claim 6, wherein information related to the correlation of the plurality of other dynamic security assessments and the static security assessment and the shortest path to fix the one or more application vulnerabilities is stored in a graph database to facilitate remediation.

11. A non-transitory computer readable medium having stored thereon instructions for fixing application vulnerabilities, the instructions comprising machine executable code which, when executed by a processor, causes the processor to perform steps comprising:

identifying one or more application vulnerabilities through a first dynamic security assessment and a static security assessment of an application;

fixing at least one of a first set of vulnerability instances reported in the static security assessment based on a secure coding practice;

running a plurality of other dynamic security assessments to identify one or more of a second set of vulnerability instances reported in the first dynamic security assessment that have been fixed by the fixing of the at least one of the first set of vulnerability instances reported in the static security assessment;

identifying one or more of a third set of vulnerability instances reported in the plurality of other dynamic security assessments that correspond to the at least one of the first set of vulnerability instances reported in the static security assessment by correlating one or more results of the plurality of other dynamic security assessments and the static security assessment;

determining a shortest path to fix the one or more application vulnerabilities when one or more of the third set of vulnerability instances reported in the plurality of other dynamic security assessments correspond to at least one of the first set of vulnerability instances reported in the static security assessment; and fixing the one or more vulnerabilities based on the correlation and the shortest path to fix the one or more application vulnerabilities.

12. The non-transitory computer readable medium as claimed in claim 11, further comprising machine executable code which, when executed by the processor, further causes the processor to perform at least one additional step comprising: creating a database configured to store information related to at least the third set of vulnerability instances reported in the plurality of other dynamic security assessments and the first set of vulnerability instances reported in the static security assessment.

13. The non-transitory computer readable medium as claimed in claim 11, further comprising machine executable code which, when executed by the processor, further causes the processor to perform at least one additional step comprising: running one or more scripts to organize information related to the one or more application vulnerabilities.

14. The non-transitory computer readable medium as claimed in claim 11, wherein one or more results of the correlation are represented in the form of a bipartite graph.

15. The non-transitory computer readable medium as claimed in claim 11, wherein information related to the correlation of the plurality of dynamic security assessments and the static security assessment and the shortest path to fix the one or more application vulnerabilities is stored in a graph database to facilitate remediation.

* * * * *